US00RE38794E

(19) United States
(12) Reissued Patent
Danner

(10) Patent Number: US RE38,794 E
(45) Date of Reissued Patent: Sep. 13, 2005

(54) ELECTRONIC FIREARM AND PROCESS FOR CONTROLLING AN ELECTRONIC FIREARM

(75) Inventor: Dale R. Danner, Eastview, KY (US)

(73) Assignee: RA Brands, L.L.C., Madison, NC (US)

(21) Appl. No.: 09/483,467

(22) Filed: Jan. 13, 2000

Related U.S. Patent Documents

Reissue of:
(64) Patent No.: 5,755,056
Issued: May 26, 1998
Appl. No.: 08/680,490
Filed: Jul. 15, 1996

(51) Int. Cl.[7] ..... F41A 19/58; F41A 19/70
(52) U.S. Cl. ..... 42/84; 89/28.05
(58) Field of Search ..... 42/84, 1.03, 1.05, 42/1.01; 89/28.05, 27.1

(56) References Cited

U.S. PATENT DOCUMENTS

| | | | | |
|---|---|---|---|---|
| 337,872 | A | 3/1886 | Russell | |
| 2,279,692 | A | 4/1942 | Marten-Gwilliam | 89/20 |
| 2,780,882 | A | 2/1957 | Temple | |
| 2,957,391 | A | 10/1960 | Lovercheck | |
| 3,250,034 | A | 5/1966 | Simmons | |
| 3,255,547 | A | 6/1966 | Gregory, Jr. | |
| 3,299,812 | A | 1/1967 | Suh et al. | |
| 3,495,349 | A | 2/1970 | Thompson | 42/84 |
| 3,613,282 | A | 10/1971 | Ramsay | |
| 3,650,174 | A | 3/1972 | Nelsen | 89/28 |
| 3,736,837 | A | 6/1973 | Kaprelian et al. | 89/28 |
| 3,783,788 | A | 1/1974 | Hayashi | 102/28 |
| 3,814,017 | A | 6/1974 | Backstein et al. | 102/70.2 |
| 3,886,793 | A | 6/1975 | Cramer et al. | 73/167 |
| 4,287,394 | A | 9/1981 | Hargita et al. | 200/5 |
| 4,324,060 | A | 4/1982 | Lawrence | 42/84 |
| 4,329,803 | A | 5/1982 | Johnson et al. | 42/84 |
| 4,332,098 | A | 6/1982 | Estenevy | 42/84 |
| 4,347,679 | A | 9/1982 | Grünig et al. | 42/84 |
| 4,563,828 | A | 1/1986 | Kriegeskorte | 42/84 |
| 4,727,670 | A | 3/1988 | Krouse | 42/69 |
| 4,793,085 | A | 12/1988 | Surawski et al. | 42/84 |
| 4,944,224 | A | 7/1990 | Fiedler et al. | 102/202.2 |
| 4,956,029 | A | 9/1990 | Hagel et al. | 149/19.8 |
| 4,960,033 | A | 10/1990 | Quantz | 89/28.05 |
| 4,970,819 | A | 11/1990 | Mayhak | 42/70.01 |
| 5,062,232 | A | 11/1991 | Eppler | 42/70.11 |
| 5,083,392 | A | 1/1992 | Bookstaber | 42/84 |
| 5,235,129 | A | 8/1993 | Corney | 89/28.05 |
| 5,272,828 | A | 12/1993 | Petrick et al. | 42/84 |
| 5,301,448 | A | 4/1994 | Petrick et al. | 42/70.01 |
| 5,303,495 | A * | 4/1994 | Harthcock | 42/84 |
| 5,329,840 | A | 7/1994 | Corney | 89/135 |
| 5,351,597 | A | 10/1994 | Holmström et al. | 89/6.5 |
| 5,461,812 | A | 10/1995 | Bennett | 42/70.11 |
| 5,608,982 | A | 3/1997 | Bouvard et al. | 42/84 |
| 5,625,972 | A | 5/1997 | King et al. | 42/84 |
| 5,640,026 | A | 6/1997 | Terazono | 257/192 |

FOREIGN PATENT DOCUMENTS

| | | |
|---|---|---|
| DE | 2837738 | 2/1980 |
| GB | 2 072 811 A | 10/1981 |

OTHER PUBLICATIONS

Sitton, G., "Voere VEC 91 Rifle" Petersen's Hunting 84 (Feb. 1993), 2 pages.

* cited by examiner

*Primary Examiner*—Stephen M. Johnson
(74) *Attorney, Agent, or Firm*—Womble Carlyle Sandridge & Rice, PLLC

(57) ABSTRACT

Electronic firearm for firing electrically activated ammunition comprising a system control means for controlling and regulating firing, diagnostic functions, power consumption, and a process for operating the firearm.

69 Claims, 9 Drawing Sheets

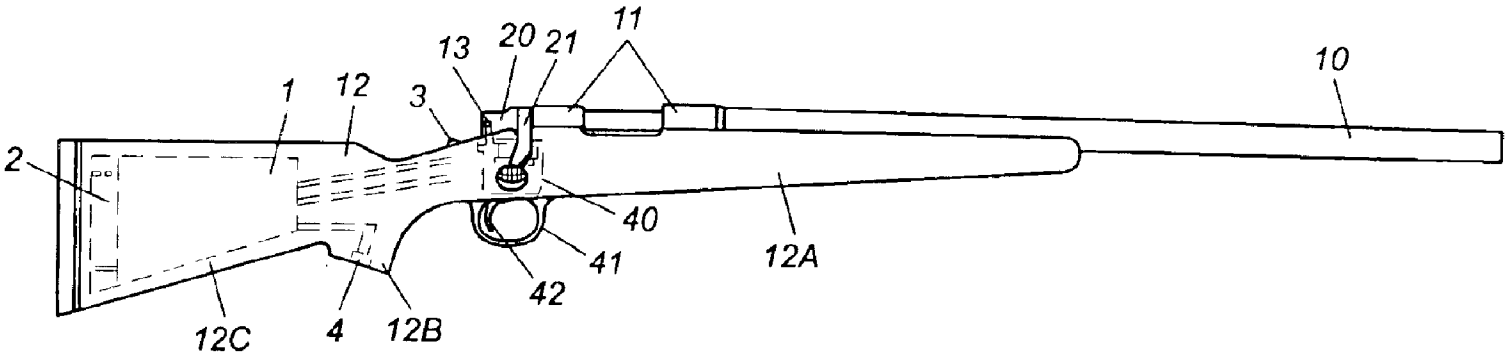
Fig. 1A
NEW

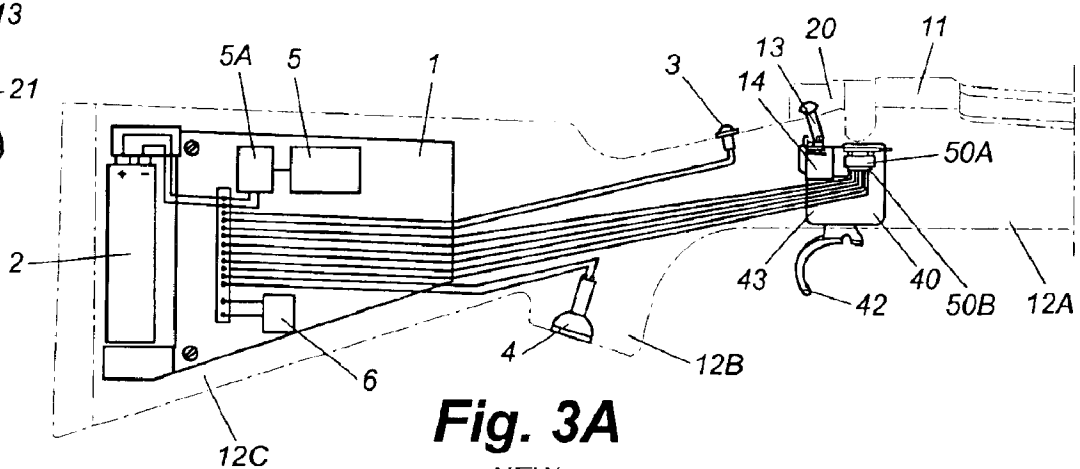
Fig. 3A
NEW
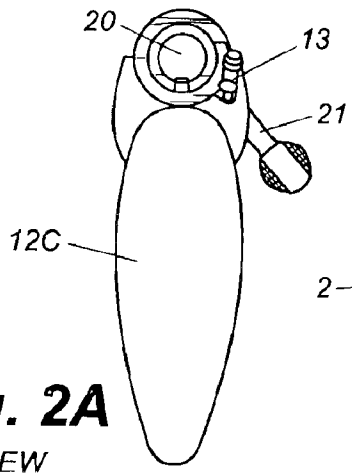
Fig. 2A
NEW

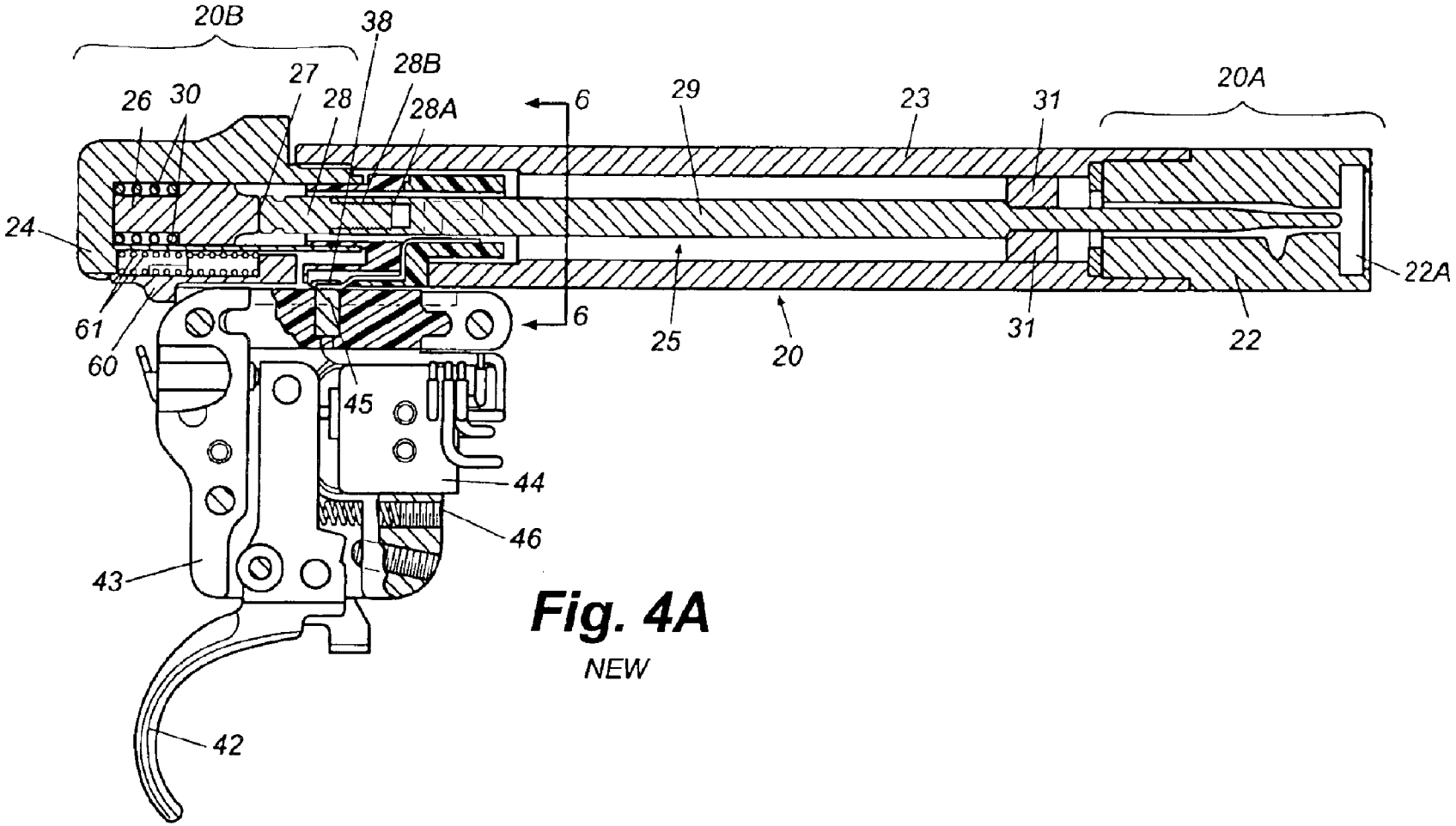
Fig. 4A
NEW

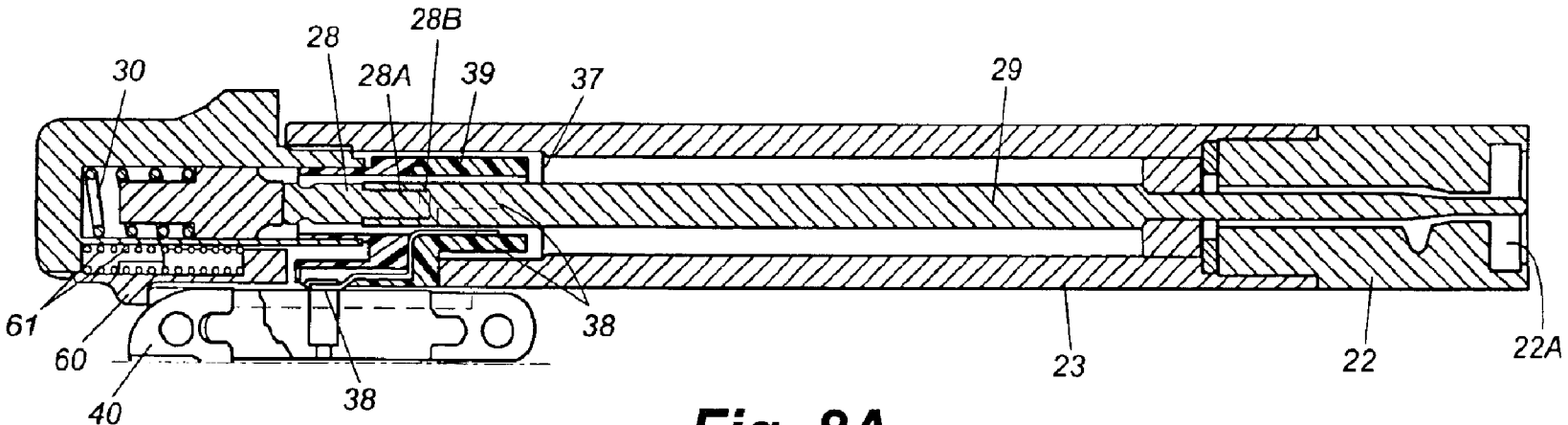
Fig. 8A
NEW

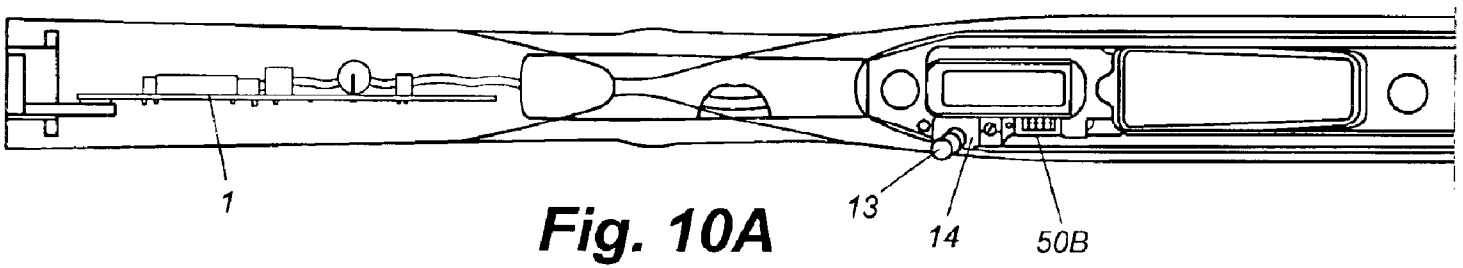
Fig. 10A
NEW

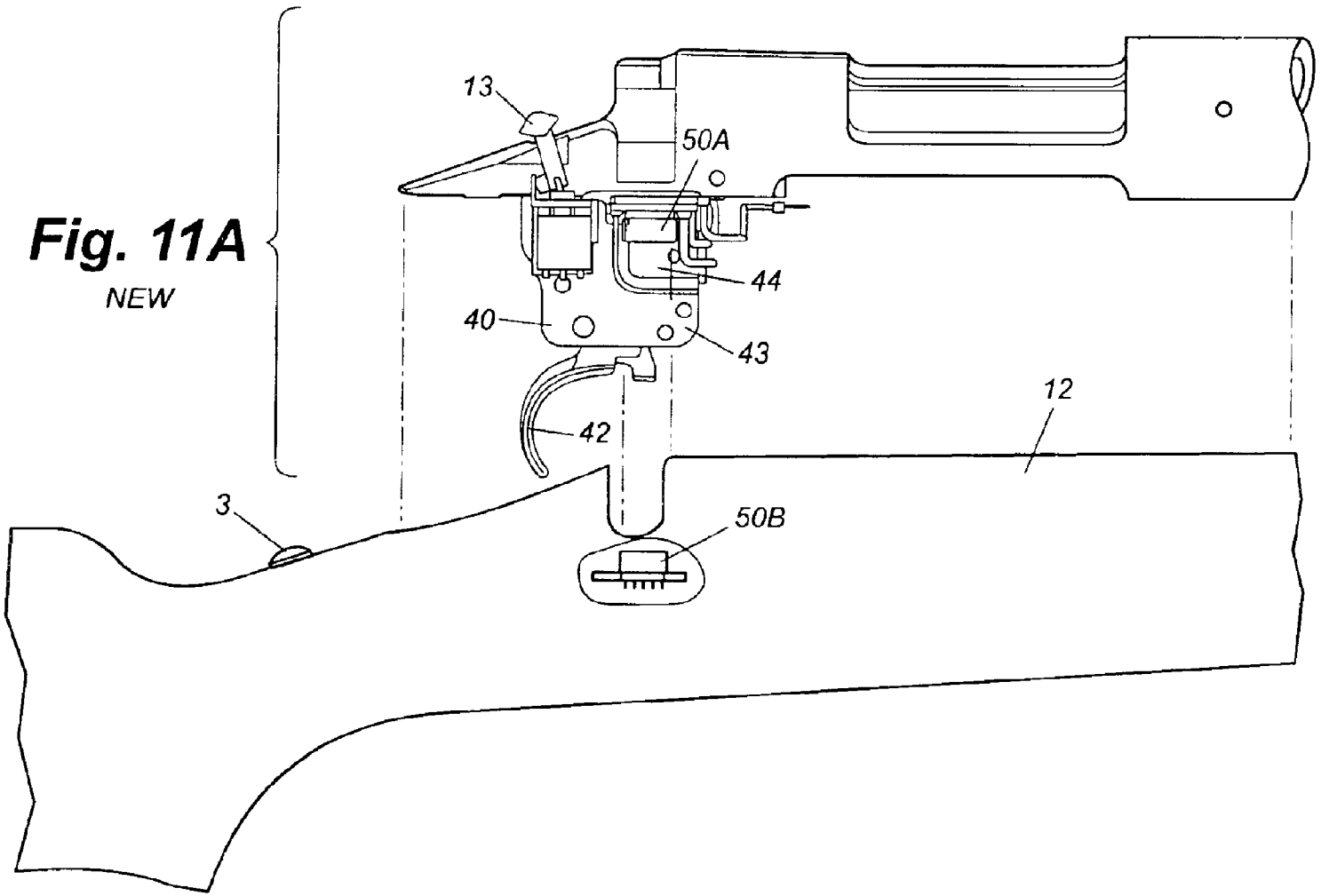
Fig. 11A
NEW

ELECTRONIC FIREARM AND PROCESS FOR CONTROLLING AN ELECTRONIC FIREARM

Matter enclosed in heavy brackets [ ] appears in the original patent but forms no part of this reissue specification; matter printed in italics indicates the additions made by reissue.

BACKGROUND OF THE INVENTION

This invention relates to firearms and more particularly to electronic firearms for firing electrically activated ammunition. Specifically, the present invention relates to an electronic firearm for firing electrically activated ammunition and a process for controlling an electronic firearm.

While there are many prior references to electronic firearms in general, and more specifically to electronic firearms for firing electrically activated ammunition, these prior references have failed to provide a control system for coordinating and controlling the firearm's electronic components and the functions they execute and regulate. Much like there is a need for a brain to control the many components in a human body and communicate with and monitor those components through an electronic network of nerves, there is a need for a system control or brain in an electronic firearm to regulate the flow of electricity, control the many electronic components, and monitor the functions of each component and the whole to assure a more reliable and accurate firearm.

Accordingly, a need remains for a more reliable and accurate electronic firearm for firing electrically activated ammunition.

SUMMARY OF THE INVENTION

The present invention provides an electronic firearm and a system for controlling the firearm which exhibits a reliability and level of control that has heretofore been unavailable.

Specifically, the present invention provides[, in] *for* an electronic firearm for firing electrically activated ammunition. *In a first example embodiment of an electronic firearm* comprising a barrel attached to a receiver, a chamber formed in the barrel adjacent to the receiver, the receiver being adapted to receive at least one round of electrically fired ammunition, the barrel and receiver encased in a stock, a moveable bolt assembly positioned within the receiver, the bolt assembly being adapted to convey a round of ammunition from the receiver into the chamber of the barrel, the bolt assembly comprising a bolt body, a bolt handle capable of moving the bolt assembly among open, closed, and closed and locked positions, and an electrically conductive firing pin, a trigger assembly operatively connected to the bolt assembly, a voltage supply means, and a safety mechanism having at least a "safe" and "fire" position, the improvement comprising:

A. A system control means receiving power from the voltage supply means, programmed to control firing, safety, power conservation, and diagnostic functions, the system control means comprising:

i. Voltage increasing means connected to transmit increased voltage to the firing pin;

ii. Switching means for isolating the firing pin from the voltage increasing means, and the voltage increasing means from the voltage supply means, the switching means being activated upon the occurrence of at least one condition selected from:

a. the absence of a round of ammunition within the chamber of the barrel;

b. the safety being in the safe position;

c. the bolt being in the unlocked position;

d. the bolt being in the open position;

e. the passing of a predetermined period of inactivity of the firearm; and f. the failure or malfunction of the system control means or any component connected thereto;

iii. Means for electronically detecting the presence of a round of ammunition within the chamber of the barrel;

iv. Means for monitoring the capacity of the voltage supply means; and v. Electronic safety operatively connected to the safety mechanism for preventing voltage from reaching the firing pin when the safety is in the safe position and for preventing the system control means from detecting a trigger pull when the safety is in the safe position;

B. Electronic trigger switch operatively connected to the trigger and the system control means, the electronic trigger switch adapted to send a signal to the system control means when the trigger is pulled;

C. Electrical isolation means insulating the body of the firing pin, the firing pin having a forward conductive end and a rearward conductive area, the forward conductive end positioned to transmit voltage to a round of ammunition within the chamber of the barrel only when the bolt assembly is in a closed and locked position, the rearward conductive area positioned to receive voltage only when the bolt assembly is in the closed and locked position; and D. At least one indicator operatively connected to the system control means.

The instant invention further provides a process for firing electrically activated ammunition from [the] *an* electronic firearm*, such as the example of an electronic firearm* described above, comprising:

A. Controlling and coordinating all firing, safety, power conservation, and diagnostic functions, and regulating the distribution of power to the firing pin by:

i. Increasing the voltage from the voltage supply means, and regulating the transmission of the increased voltage to the firing pin;

ii. Conserving power by isolating the firing pin from the voltage increasing means, and the voltage increasing means from the voltage supply means, upon the occurrence of at least one condition selected from:

a. the absence of a round of ammunition within the chamber of the barrel;

b. the safety being in the safe position;

c. the bolt being in the unlocked position;

d. the bolt being in the open position;

e. the passing of a predetermined period of inactivity of the firearm;

f. the failure or malfunction of the system control means or any component connected thereto;

iii. Electronically detecting the presence of ammunition within the chamber of the barrel;

iv. Monitoring the capacity of the voltage supply means; and v. Preventing voltage from reaching the firing pin when the safety is in the safe position and preventing the system control from accepting the signal from the trigger switch generated by a trigger pull when the safety is in the safe position;

B. Sending a signal to the system control means when the trigger is pulled; and

C. Indicating the status of the firearm.

BRIEF DESCRIPTION OF THE DRAWINGS

*FIGS. 1 and 1A are* side elevational [view] *views* of a firearm of the invention.

*FIGS. 2 and 2A are* left rear elevational [view] *views* of a firearm of the present invention.

*FIGS. 3 and 3A are* wiring [diagram] *diagrams* of one embodiment of a firearm of the invention.

*FIGS. 4 and 4A are* cross sectional [view] *views* in elevation showing one embodiment of a bolt assembly and trigger assembly of a firearm of the present invention with the firing pin in its rearwardmost position.

*FIGS. 8 and 8A are* cross sectional [view] *views* in elevation showing the bolt assembly of [FIG. 4] *FIGS. 4 and 4A* with the firing pin biased forward.

*FIGS. 10 and 10A are* fragmental top plan [view] *views* of a firearm of the present invention with the barrel assembly removed.

*FIGS. 11 and 11A are* fragmental exploded [view] *views* of a firearm of the present invention.

DETAILED DESCRIPTION OF THE INVENTION

Figure 1:
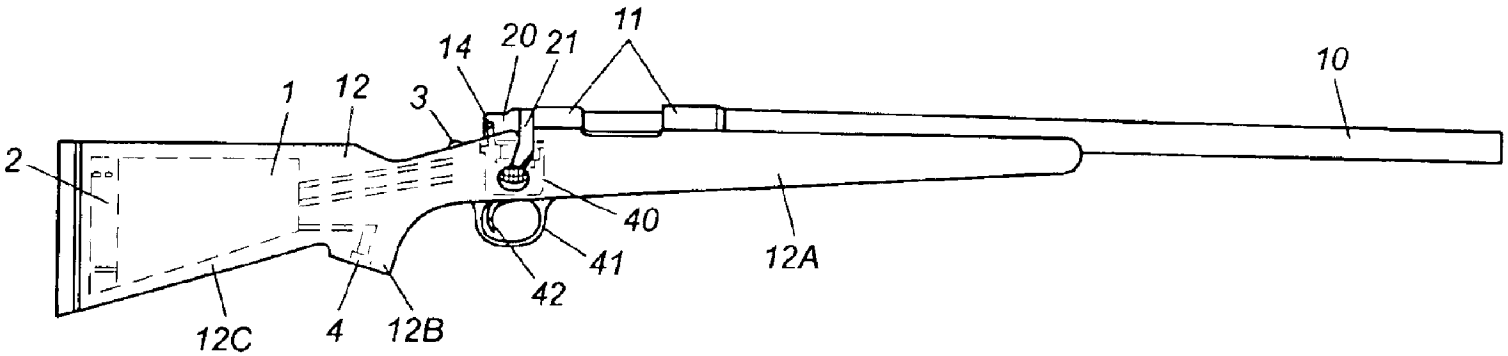
[FIG. 1 is a]

The present invention will be more fully understood by reference to the figures.

The description below pertains to one embodiment of an operational sequence that can be utilized by a system control means of a firearm of the present invention. [Variations] *The present invention can be used with a variety of different types of firearms, and variations* and modifications of this operational sequence can be substituted without departing from the principles of the invention, as will be evident to those skilled in the art.

The system control means can vary widely, and can be selected from software, firmware, microcode, microprocessor, microcontroller, discrete digital logic, discrete analog logic, and custom integrated logic, and the like. The specific system control means selected can be programmed or otherwise directed to utilize an operational sequence of the present invention by various methods known in the computer arts. The system control means is preferably embodied on a circuit board, and the circuit board can be of a modular type commonly used in personal computers. To decrease the possibility of malfunction from environmental or other external conditions, the circuit board preferably comprises a protective surface modification. The system control means can be within the firearm or external to it. However, it is preferably within the firearm, and positioning within the stock of the firearm is especially preferred.

The operational sequence is based upon an embodiment of a firearm of the present invention in which the system control means is activated by the insertion of a voltage supply means, such as a battery. Once activated, there are two conditions from which the system control means will proceed to analyze information and control the components of the system, depending on the circumstances, these being a cold start and a warm start.

A cold start is defined as the initial activity of the system control means upon being activated. The system control means is activated by the installation of a voltage supply means, preferably a commercially available 9 volt battery. A system authorization switch is provided which communicates with the system control to activate the firearm. In a preferred embodiment, the system authorization switch is key activated to prevent unauthorized activation of the firearm.

According to the operational sequence discussed above, if the voltage supply means, in this embodiment a battery, has been inserted into the firearm, the system control will receive power and check to assure the battery is viable. A viable battery is one that the system control determines exceeds a predetermined voltage level. In the embodiment shown, an indicator such as an LED is operatively connected to the system control means to convey information from the system control means regarding the status of the firearm to the operator. Specifically, the system control means can cause the LED to be illuminated in one color to signify that the system control means is operational and it can cause the LED to be illuminated in a different color to convey other information. Alternately, the system control can be connected to several LEDs or other visual indicators, or the indicator can consist of audio signals. In the embodiment shown, if the system control detects a weak battery, it causes the LED to intermittently flash an error code to signal an error and alert the operator to the problem.

According to the present operational sequence, if the system control has been activated and has determined that the battery is viable, it will then check to determine whether the firearm's electronic safety switch is in the safe position. If the safety is not in the safe position, the system control will flash an error code and recheck to determine whether the battery is viable. While the system control is communicating an error to the operator via the LED, it will not permit the firearm to be fired. If the condition causing the system control to communicate the error is not corrected within a predetermined period of time, the system control will place the firearm in a sleep mode. The sleep mode is discussed in detail below. If the system control determines that the battery is viable and the safety is not in the safe position, it will continue to flash the error code on the LED until the safety is moved to the safe position. After the safety has been placed in the safe position, the system control will place the firearm in the sleep mode until the operator causes the system control to awaken the firearm. The process of awakening the firearm from the sleep mode, called a warm start, is accomplished by switching the safety from the safe position to the fire position.

After determining that the battery is viable, the system control means will place the firearm in a sleep mode to conserve power. The firearm will remain in the sleep mode until the actions of the firearm's operator cause the system control to awaken the firearm from the sleep mode. The system control means can notify the operator that it has placed the firearm in the sleep mode by extinguishing the LED. When the firearm is in the sleep mode, the system control isolates the firing pin from the voltage increasing means. In the sleep mode, power consumption is significantly decreased, and the potential of the firearm being accidentally discharged or activated is significantly reduced because the firing pin is electrically isolated and cannot receive power, and thus cannot discharge any power to ammunition that may be present in the chamber of the barrel.

In addition to isolating the firing pin from the voltage increasing means when the firearm is placed in the sleep mode, the system control will also isolate the voltage increasing means from the battery and cause it to safely discharge any energy stored therein.

For example, if the firearm were loaded and dropped while in the sleep mode, the force of the drop would not cause the ammunition to be activated because the firing pin would have been electrically isolated by the system control means. Even if the force of the drop was sufficient to cause the trigger to close and activate the electronic trigger switch, the logic signal sent by the trigger switch to the system control would not cause the system control to direct power to flow from the voltage increasing means to the firing pin, and energy stored in the voltage increasing means will have been eliminated and thus would be insufficient to activate the ammunition. Accordingly, the sleep mode function of the system control can help prevent accidental activation of ammunition that may be in the chamber of the firearm under the above circumstances, and it provides a means of conserving the energy of the battery effectively extending the battery life. Consequently the firearm is more likely to be capable of firing over a longer period of time.

When the firearm is in the sleep mode, the system control will initiate a warm start when the safety is switched from the safe to the fire position. After the safety has been placed in the fire position, the system control determines whether the trigger has been pulled and held while the safety was switched from the safe to the fire position. This feature further limits the possibility of accidental firing and is not found in many previous electronic firearms. If the trigger has been pulled and held as the safety is being switched to the fire position, the system control will activate the error code, and will continue to flash the error code until the safety is switched back to the safe position. After the safety has been switched to the safe position, the system control will return the firearm to the sleep mode until a warm start is again initiated. The system control will not awaken the firearm until the safety is switched from the safe to the fire position and the system control does not detect the trigger being pulled during the transition from safe to fire position.

According to this operational sequence, if the safety has been switched from the safe to the fire position and the system control does not detect trigger pull by sensing the condition and position of the switch in the trigger assembly, the system control will check to determine the voltage level of the battery. If the system determines that the battery voltage level is below a first predetermined minimum level, an error code will be flashed to notify the operator that the battery should be replaced. The system control will then compare the voltage level of the battery to a second predetermined minimum, and if the voltage level is below the second predetermined minimum, the system control will shut down the firearm. When the firearm is shut down, a new battery must be inserted before the system control can be reactivated. Once the battery has been installed, the firearm restarts in the cold start state as previously discussed.

If the system control determines that the voltage level is below the first predetermined minimum but exceeds the second predetermined minimum, it will flash an error code while checking to determine whether the bolt assembly is in the closed and locked position. If the system control determines that the bolt assembly is not in the closed and locked position, it will continue to check the voltage level of the battery to determine if it exceeds the second minimum until the bolt assembly is closed and locked. However, if the bolt assembly is not closed and locked within a predetermined period of time, the system control will place the firearm in the sleep mode.

After the system control determines that the level of voltage from the battery exceeds either predetermined minimum level and that the bolt assembly is in the closed and locked position, it will proceed to check for the presence of a round of ammunition within the chamber of the barrel. If no round of ammunition is detected within the chamber of the barrel, the system control will recheck the safety to determine whether it is in the fire position. If the safety is not in the fire position, the firearm will be placed in the sleep mode. If, however, the safety is in the fire position and no round is detected, the system will recheck the battery voltage level to assure that the battery is viable. At this stage of the sequence, if the system control determines that the battery's voltage level is above the second minimum limit, the battery, bolt, and round present check process will continue for a predetermined time period, after which the firearm will be placed in sleep mode.

The system control, by communicating with the means for detecting a round of ammunition within the chamber, can detect the presence of a round in the chamber. In alternate embodiments, the system control can also be adapted to test the detected round to determine if it is viable, as is more fully described below.

As the system control continues to follow this operational sequence, it will supply the voltage increasing means with power from the battery if it determines a round is present, or in alternate embodiments, if the round in the chamber is viable. When the system control means determines that the voltage increasing means is charged, it can notify the operator that the firearm is ready to be fired by illuminating the LED. At this point in the process, the power in the voltage increasing means will be released to the firing pin when the system control receives a logic signal from the trigger switch when the trigger is pulled, thus firing the electrically activated round of ammunition. If the trigger is not pulled within a predetermined period of time, the system will place the firearm in the sleep mode and cause the voltage increasing means to safely discharge the energy stored therein. The system control will notify the operator of the change in the firearm's status through the LED. When the firearm is placed in the sleep mode with the safety in the fire position, the operator may reawaken the firearm from the sleep mode by cycling the safety switch from fire back to the safe position, and back again to the fire position.

According to this sequence, after the firearm has been fired, the voltage increasing means and the LED will be shut down by the system control, which will then check to determine whether the safety is in the fire position. Subsequently, the system control will check the voltage level of the battery, whether the bolt assembly is closed and locked, and whether a round is present in the chamber. If the safety is in the fire position, the battery is viable, the bolt is closed and locked, and a viable round of ammunition is present in the chamber, the system control will return to the firing sequence detailed above.

By directly controlling the voltage increasing means and the means for detecting the presence and viability of a round of ammunition within the chamber, the system control provides a means of increasing the reliability of an electronic firearm for firing electronically activated ammunition. The system control receives a logic signal when the trigger is pulled, but this signal is not transformed into a command to fire the weapon until the system control has communicated with the electronic safety switch, the bolt assembly, and the means for detecting the presence and viability of a round within the chamber. Only after the system control has determined that all conditions for which it has been programmed to check have been satisfied will it allow the firearm to be fired. If the preprogrammed conditions have all been met, upon the pulling of the trigger the system control will cause the voltage increasing means to discharge its power to the electronic contact on the trigger assembly, through the firing pin contact and the firing pin and to the ammunition.

FIGS. 1 through [11] *11A* show various aspects of possible *example* embodiments of a firearm of the present invention that can be adapted to utilize the operational sequence described above. [Variations] *The present invention can be adapted for use with a variety of different types of firearms and variations* and modifications of these embodiments can be substituted without departing from the principles of the invention, as will be evident to those skilled in the art.

In FIGS. 1 through [11] *11A, an example embodiment of the present invention is illustrated, in which* the firearm has a barrel 10 which is attached to receiver 11, and a stock 12. The stock consists of a forearm 12A at a forward portion thereof, a pistol grip 12B at a middle portion, and a butt 12C at a rearward portion thereof. Both the barrel and receiver are encased in the forearm 12A of the stock 12. The barrel has a chamber formed in its rear end where it is attached to the receiver. The chamber is connected and adapted to receive ammunition from the receiver. A bolt assembly, generally indicated as 20, is movably positioned within the receiver, behind and substantially aligned with the barrel, and has a handle 21. The barrel 10, receiver 11, bolt assembly 20, and trigger assembly 40 comprise the barrel assembly of the firearm. A safety switch [14,] *13* (*FIGS. 1A, 2A, 3A, 10A and 11A*) is shown behind the bolt assembly, which is shown in FIGS. 1, *1A* and 2, *2A* in a closed and locked position.

The firearm has a system control means 1, which in the embodiment shown is in the butt of the stock. The firearm further comprises a voltage supply means 2, shown in the butt of the stock. The voltage supply means, which in the embodiment shown is a battery, provides power to and is operatively connected to the system control means. In the Figures, the firearm has an electronic safety 14, an LED indicator 3, and a system authorization switch 4 for controlling access to the firearm. The selection and positioning of the LED indicator can vary widely, according to the design parameters of the particular firearm. In the embodiment discussed above, at least one visual LED indicator is positioned on the stock of the firearm directly behind the receiver. Similarly, the selection and positioning of the system authorization switch can vary widely, but in the embodiment of the firearm shown, the system authorization switch is key activated and located on the bottom portion of the pistol grip of the stock.

Figure 3:
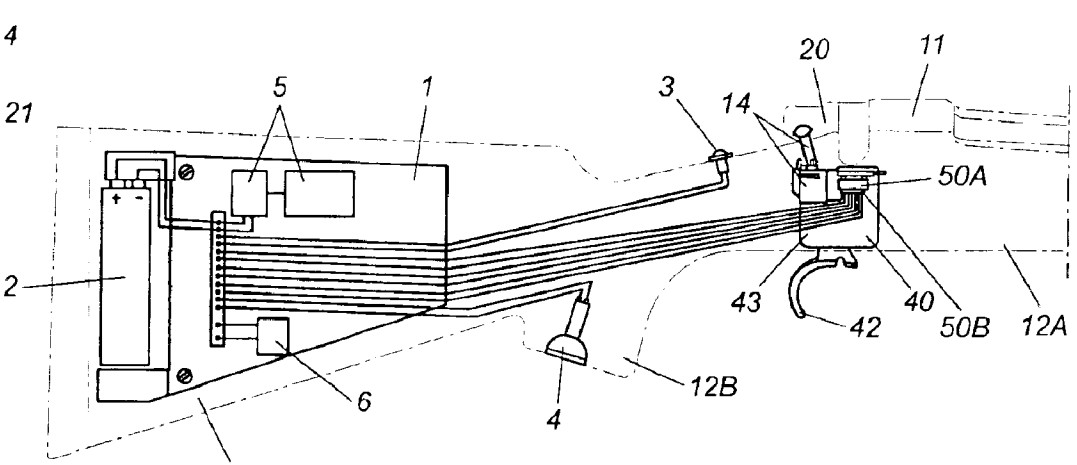
[FIG. 3 is a]
Figure 2:
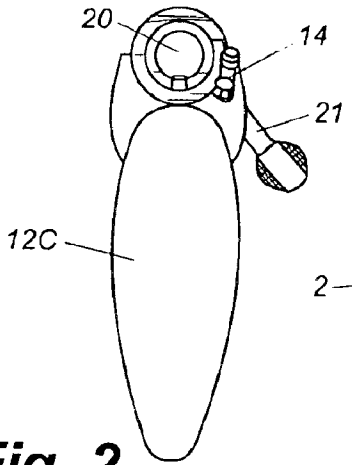
[FIG. 2 is a]

FIG. 3 is a wiring diagram showing the voltage supply means 2, system control 1, system authorization switch 4, LED indicator 3, and electronic safety switch 14 as they are wired together. In addition, FIG. 3 shows a blind mate circuitry connection having one connector 50A mounted to the trigger assembly 40 and a reciprocal mating connector 50B mounted into the forearm of the stock and attached to wires from the system control means. The reciprocal connector mounted in the stock is positioned to mate with the other connector when the barrel assembly is installed in the firearm. When the reciprocal connector is mated with the other connector, a connection is provided whereby the electronic safety switch and the trigger assembly are connected to the system control means.

The system control means shown comprises voltage increasing means 5, *an electronic switching means 5A* (*FIG. 3A*), and means for detecting the presence of a round of ammunition 6 within the chamber. The embodiment of the voltage increasing means shown comprises a boost converter to increase the voltage from the battery to the level necessary to initiate the ammunition, for example, from 9 volts, if a battery of that voltage is used as the power source, to a voltage sufficient to initiate the electrically primed ammunition. The voltage increasing means typically comprises inductors, diodes, capacitors and switches, the arrangement of which is dependent on the specific boost converter used. Other embodiments may use converters other than the boost topology. Variations and modifications of these embodiments can be substituted without departing from the principles of the invention, as will be evident to those skilled in the art.

The embodiment of the means for detecting the presence of a round within the chamber shown comprises a comparator circuit. Through the comparator circuit, the system control analyzes the impedance detected when it transmits a small level of current through the firing pin. If a round is present within the chamber, the current will be transmitted from the firing pin through the round of ammunition and into the barrel of the firearm, which acts as a ground and completes the circuit. By comparing the level of impedance detected with an established level of impedance the system control can determine whether a round is present, and in alternate embodiments, can also determine whether the detected round is viable.

Figure 10:
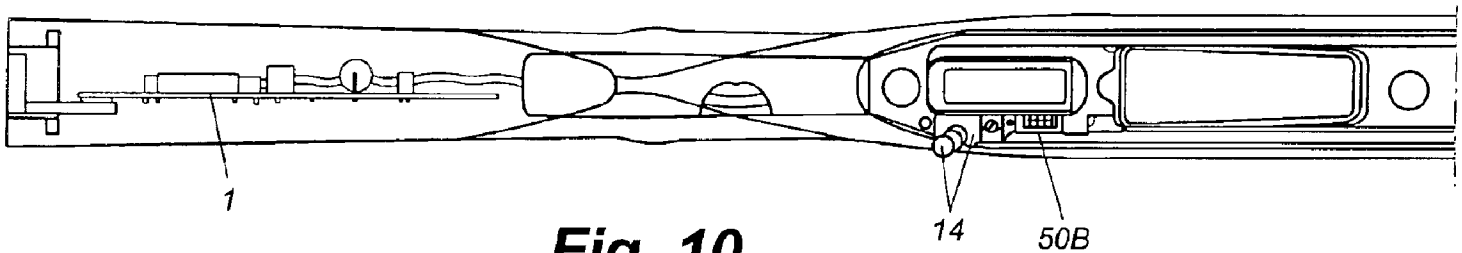
[FIG. 10 is a]
Figure 11:
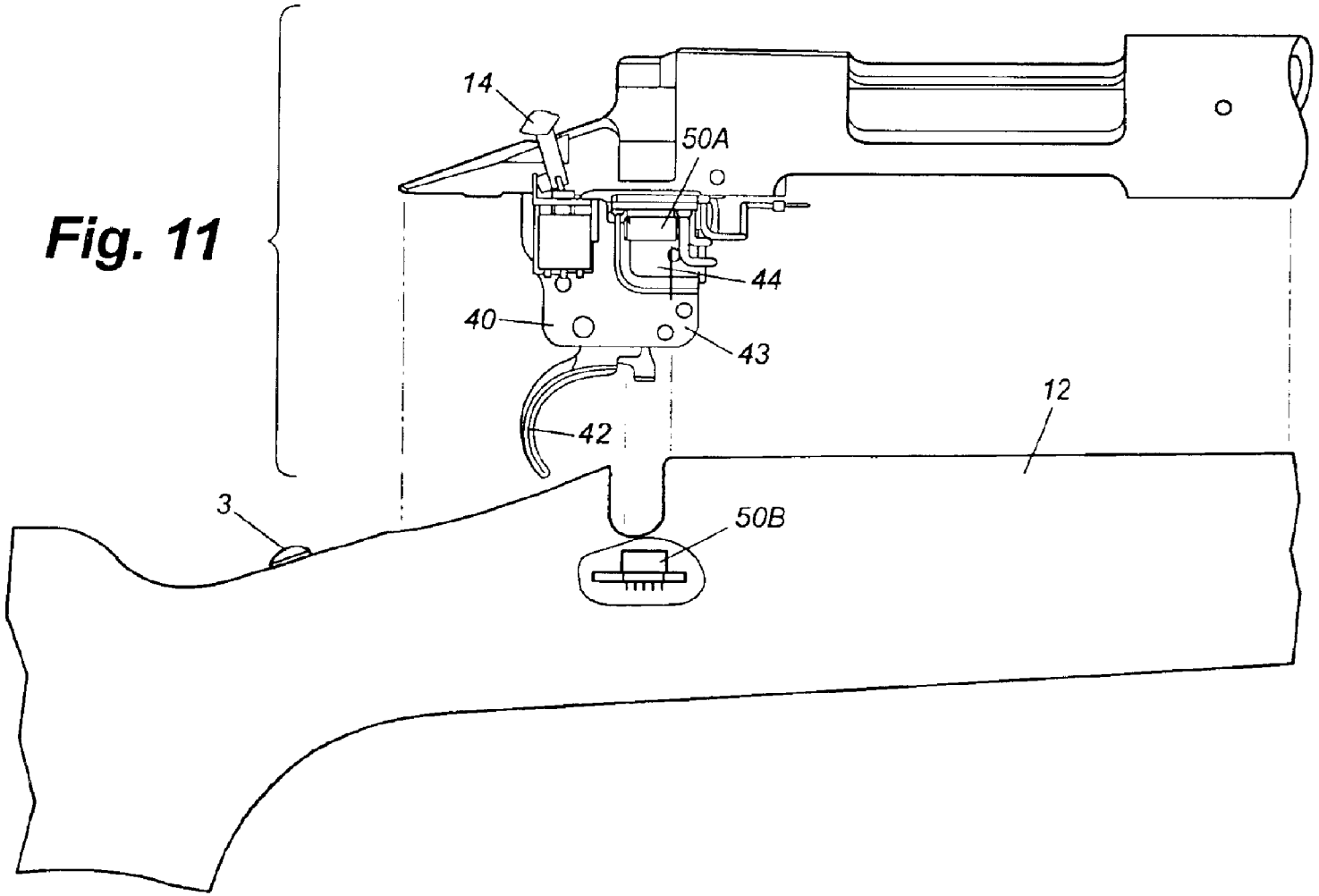
[FIG. 11 is a]

FIG. 11 is a fragmental exploded view of the firearm showing the barrel assembly removed from the stock 12, and FIG. 10 is a fragmental top plan view of the firearm with the barrel assembly removed. By removing the barrel assembly, a blind mate connection comprising two blind mate connectors, 50A, and 50B, is broken, and is easily made when the barrel assembly is replaced in the stock.

Figure 4:
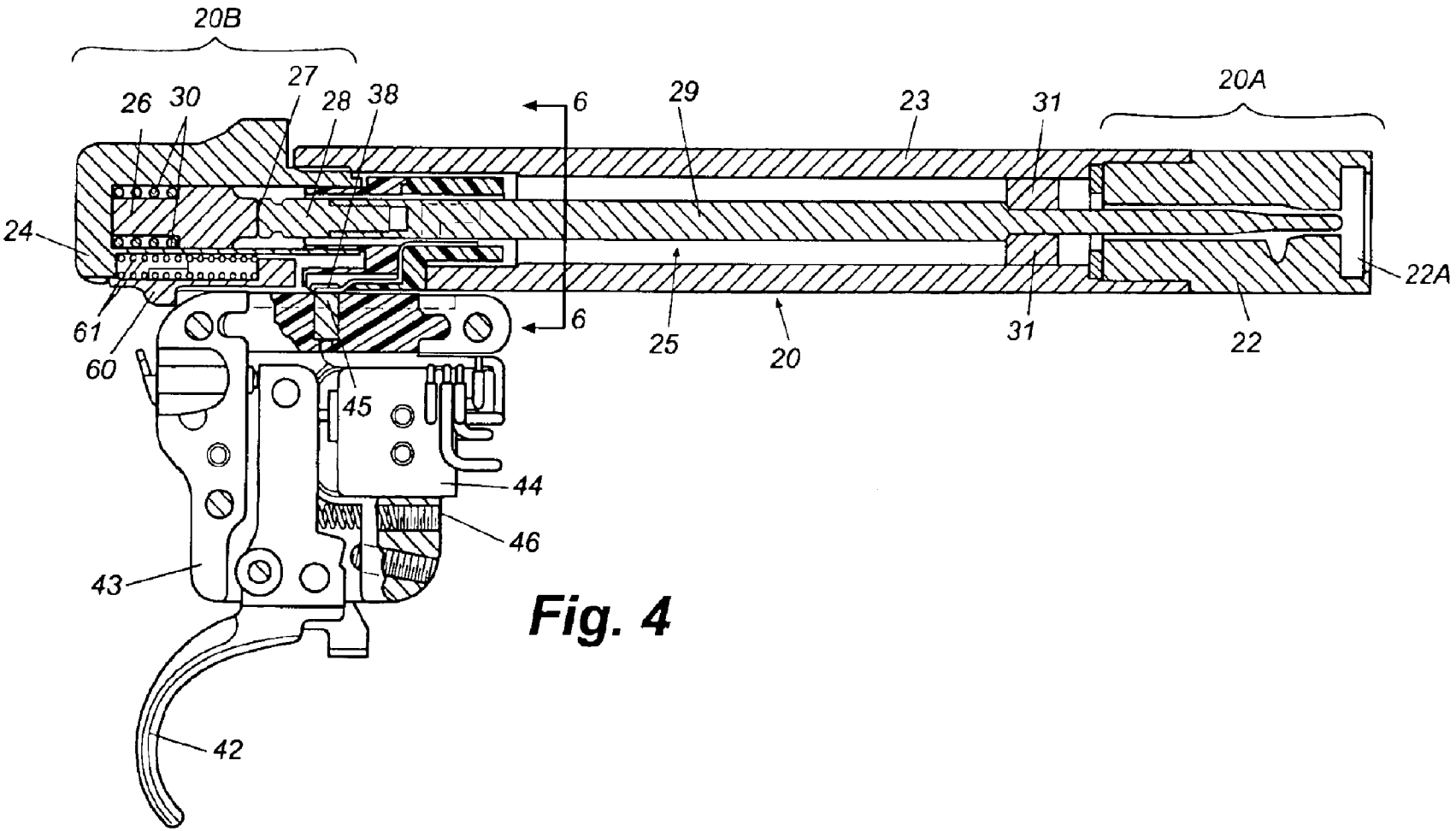
[FIG. 4 is a]

In the Figures, the bolt assembly 20 has front 20A and rear 20B ends and a bolt head 22 comprising a bolt face 22A at the front end. The bolt assembly can move longitudinally and rotationally within the receiver. More specifically, the bolt assembly can be moved among opened, closed, and closed and locked positions. When the bolt assembly is closed the bolt face is positioned within the rear of the chamber of the barrel. At the rear end 20B of the bolt assembly there is a handle 21 for moving the bolt to its alternate open, closed, and closed and locked positions. A trigger assembly 40 located below the receiver and within the forearm of the stock has a trigger guard 41 which extends below and beyond the forearm, and within the trigger guard is a trigger 42. The trigger assembly, shown in FIGS. 4 and 11, is discussed in detail below.

The bolt assembly is positioned within the receiver behind and substantially aligned with the barrel. As shown in the Figures, the bolt assembly includes a hollow bolt body 23 operatively connected at its rear end to a hollow bolt plug 24 which is sealed at its rear end, and a handle 21 on the rear of the bolt assembly which acts as a lever for moving the bolt assembly within the receiver. A movable firing pin assembly 25 is positioned within the bolt assembly and consists of a firing pin plunger 26, a firing pin plunger insulator 27, a firing pin plug 28, and the firing pin itself 29. The firing pin plunger is operatively connected at its forward end to the firing pin plug, and the firing pin plug is operatively connected at its forward end to the firing pin within the bolt body. The firing pin plunger insulator is positioned between the firing pin plunger and the firing pin plug. The firing pin plunger insulator can be a separate component attached to the forward end of the firing pin plunger, or it can comprise an insulating treatment to the forward end of the firing pin plunger.

Figure 5:
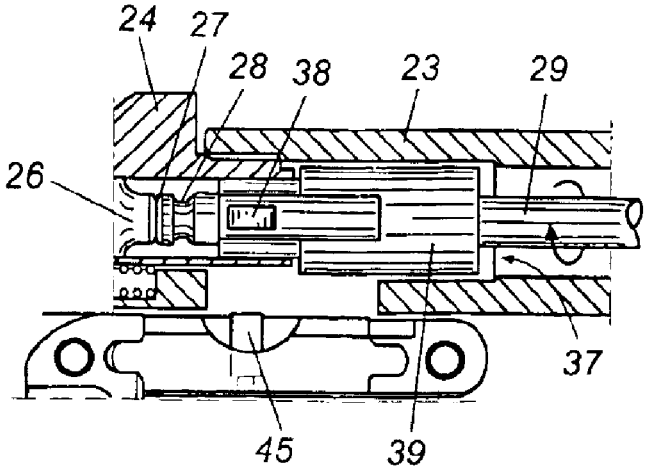
FIG. 5 is a fragmental side elevational view showing a portion of the bolt assembly as it is moved from the closed and locked position to the unlocked position.
Figure 6:
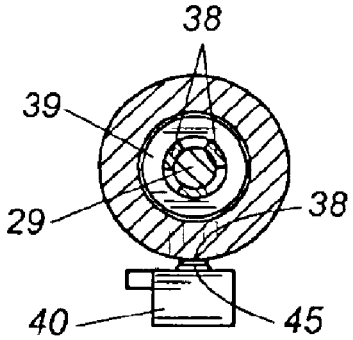
FIG. 6 is a cross sectional rear elevational view taken along line 6—6 of FIG. 4.
Figure 7:
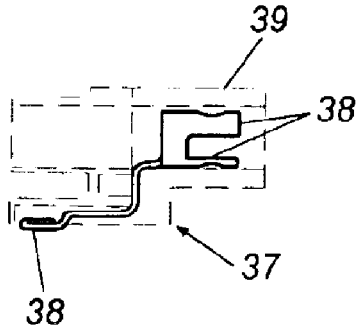
FIG. 7 is a side elevational view of a firing pin electrical contact assembly, showing the contact housing in phantom.
Figure 9:
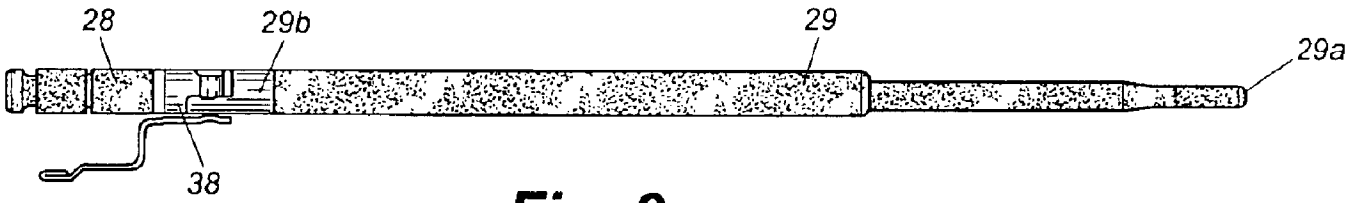
FIG. 9 is a side elevational view of a firing pin and firing pin electrical contact of the present invention

A firing pin spring 30, positioned between the sealed rear end of the bolt plug and the firing pin plunger, biases the firing pin forward by acting on the firing pin plunger. A firing pin shoulder 31 within the front end of the bolt body is positioned to restrict the forward movement of the firing pin, and the rearward movement of the firing pin is limited by the plunger contacting the rear of the bolt plug. FIG. 5 shows the firing pin assembly in its rearwardmost position, while FIG. 9 shows the firing pin assembly biased forward to contact a round of ammunition within the chamber of the barrel.

The firing pin plunger, firing pin plunger insulator, firing pin plug, and the firing pin are operatively connected to form the firing pin assembly. In alternate embodiments, the firing pin shoulder can be connected to the firing pin and a part of the firing pin assembly, or it can be positioned within the bolt body. The firing pin assembly is moveable within the bolt assembly, but its movement is restricted. Specifically, the firing pin shoulder within the front end of the bolt body is positioned to restrict the forward movement of the firing pin assembly by limiting the forward movement of the firing pin, and the rearward movement of the firing pin assembly is limited by the rear of the firing pin plunger contacting the rear of the bolt plug.

The movable firing pin assembly, biased forward by firing pin spring 30, ensures contact between the forward conductive tip of the firing pin and the primer cap at the rear of a round of ammunition within the chamber when the bolt assembly is closed and locked by permitting the firing pin assembly to position itself to compensate for manufacturing variations in ammunition. Rearward travel of the firing pin is limited to provide support for the electric primer during firing.

Figure 8:
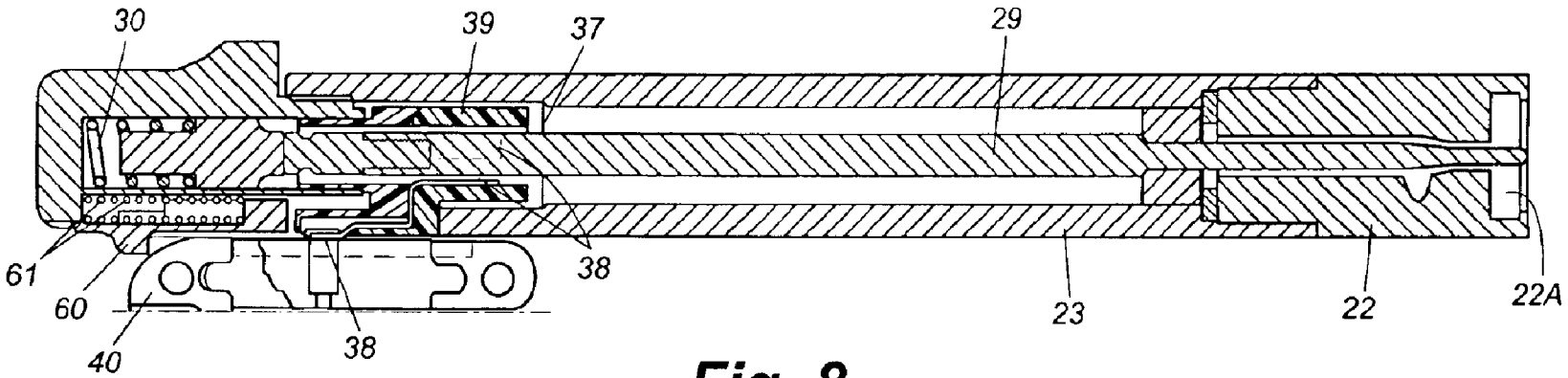
[FIG. 8 is a]

In addition, the firing pin plug and the firing pin are adapted to be adjustably connected, *such as by the engagement of threads 28A (FIGS. 4A and 8A) about the firing pin plug 28, with a corresponding thread 28B formed on the rearward area of the firing pin 29, thus* permitting individual adjustment of the firing pin in relation to the firing pin plug so that the forward tip of the firing pin is adjustable with respect to the bolt face when the firing pin is biased into its rearwardmost position, thus supporting the primer cap in the ammunition during firing and preventing the firing pin from becoming lodged within the bolt body when it is forced rearward by the ignition of a round of ammunition within the chamber, as shown in [FIG. 4] *FIGS. 4 and 4A*.

In an alternate embodiment of the firing pin assembly not here shown, the firing pin plug is a threaded adjustment screw, and the bolt plug has a threaded aperture formed in its rear end adapted to receive the adjustment screw. The firing pin spring in the bolt plug biases the firing pin assembly forward by acting on the bolt plug and the firing pin plunger. The adjustment screw contacts the rear of the firing pin plunger to restrict the rearward motion of the firing pin assembly, and can be set so that the forward tip of the firing pin is adjustable with respect to the bolt face when the firing pin is in its rearwardmost position. As in the embodiment of the firing pin assembly shown in FIGS. 4 through 8, the firing pin is biased forward to compensate for dimensional variations in ammunition to assure that the firing pin will be positioned to contact a round of ammunition within the chamber.

Like the firing pin assembly, the bolt assembly is movably mounted within the receiver of the firearm, and its movement is also limited. On the forward end of the bolt assembly, the bolt head 22 is operatively connected to the front end of the bolt body and has lugs (not shown) positioned to engage slots (also not shown) formed in the front of the receiver. The slots extend from the rear to the front of the receiver. The engagement between the lugs and the slots guides the bolt assembly, and defines its positions as opened, closed or closed and locked. In addition, when the bolt assembly is closed and locked, the engagement between the lugs and the slots prevents rearward motion of the locked bolt assembly.

The forward motion of the bolt assembly is also restricted when it is in the closed and locked position by a bolt plug detent 60 on the bottom of the bolt plug. The bolt plug detent is biased forward by a bolt plug detent spring 61. The bolt plug detent further restricts the forward movement of the bolt assembly by contacting the trigger housing when the bolt assembly is closed, and restricts forward motion when the bolt is locked. The contact between the bolt plug detent and the trigger housing secures the bolt assembly by restricting forward motion of the bolt assembly when it is in the locked position, and the engagement between the lugs and the slots further secures the bolt assembly by preventing rearward motion of the bolt assembly when it is locked.

In the embodiment of the bolt assembly shown in FIGS. 4 through 8, a firing pin contact assembly 37 consists of an electrical contact 38 and an insulating housing 39 fixed within the rear of the bolt assembly to rotate and move with the bolt assembly. The firing pin contact is positioned to connect the conductive area at the rear of the firing pin, or, in the alternate embodiment discussed above but not shown, to connect the conductive area at the rear of the firing pin assembly, with an electrical contact on the trigger assembly. The circuit between the firing pin contact and the electrical contact on the trigger assembly can only be completed when the bolt assembly is closed and locked. The firing pin contact and the conductive area at the rear of the firing pin remain connected when the bolt is locked, even as the firing pin is biased forward by the firing pin spring and rearward by a round of ammunition within the chamber of the barrel, thus allowing for dimensional variations in individual rounds of ammunition and ensuring electrical contact between the firing pin and the firing pin contact despite those variations. In addition, the movably mounted bolt assembly ensures that an electrical connection cannot be made between the firing pin and the trigger assembly electrical contact unless the bolt is in the closed and locked position, thus augmenting the system control. In an alternate embodiment of the invention, the contact point can be the firing pin plug, which them transmits the current to the ammunition in the chamber.

In FIGS. 4 through 8, the firing pin assembly is provided with electrical isolation means to insulate the body of the firing pin, and in the alternate embodiment discussed above, to insulate the body of the firing pin and the firing pin plug. FIG. 9 shows on embodiment of the firing pin provided with the electrical isolation means. The electrical isolation means does not insulate the firing pin at a forward conductive end 29A and rearward conductive area 29B. The forward conductive end is positioned to transmit voltage to a round of ammunition within the chamber of the barrel only when the bolt assembly is in a closed and locked position, and the rearward conductive area is positioned to receive voltage only when the bolt assembly is in the closed and locked position. Within these parameters, the electrical isolation means can vary widely, and can comprise an electrically insulating sleeve around appropriate portions of the firing pin, a surface coating on the firing pin, or a surface modification of the firing pin. Coating materials which can be used for the firing pin include, for example, polymers appplied preformed or in situ. Amorphous diamond or ceramics can also be used for an insulating coating on the firing pin. Of the many known ceramics that can be used, those found to be particularly satisfactory include alumina and magnesia stabilized zirconia. Surface modification of the firing pin can also include, for example, ion implantation. Still other coatings or treatments for the firing pin will be evident to those skilled in the art.

The trigger assembly comprises a trigger housing 43 which houses a trigger 42 operatively connected to a microswitch 44, and a trigger assembly contact 45. The trigger assembly contact is positioned to contact the firing pin contact at the rear end of the bolt assembly, only when the bolt assembly is in the closed and locked position. When the bolt assembly is in the closed and locked position, the trigger assembly contact and the firing pin contact are aligned to form a closed circuit, however, the system control will only permit power to be transmitted from the voltage increasing means through the trigger assembly contact, the firing pin contact, the firing pin, and to a round of ammunition as described in detail above.

The firearm of the present invention provides a desirable combination of advantages. Specifically, the firearm of the present invention is made more reliable and accurate by the incorporation of a "brain," or system control means, to process information received from the various electronic components of the firearm, and regulate and control those components accordingly, thereby controlling the operation of the firearm. By providing a system control means or "brain" to monitor and control all electronic communications and functions, the firearm of the present invention is able to incorporate an increased number of electronic components to provide a more reliable and accurate means of firing electrically activated ammunition.

The process of the present invention provides one possible framework whereby the system control means can be programmed to function. Depending on the particular firearm, the framework or program can be modified accordingly, and thus the system control means can be adapted for use in any electronic firearm, and can be further programmed to perform specific additional functions, as well as to perform those functions according to different parameters. For example, the process can include various time parameters whereby the system control means will place the firearm in the sleep mode if the firearm has been inactive over a period of time.

In addition, the system control means can be programmed to communicate with the sensing means to determine not only the presence of a round of ammunition within the chamber, but also whether that round is viable or not. This can be accomplished, for example, by programming the system control to measure the impedance of the round within the chamber through a comparator circuit of the type known in the art. The system control checks for a specific range of acceptable impedance levels, dependent on the ammunition suitable for use with that particular firearm. Specifically, an extremely low impedance would indicate a short, while an open circuit would indicate the absence of a round. If the ammunition falls within the predetermined range of acceptable impedance levels, the system control will charge the voltage increasing means in anticipation of firing the round. The means for determining whether the detected round is viable can comprise means for measurement of the DC resistance of the round or measurement of the AC impedance of the round. If the round is not viable, the LED will not illuminate, and after a predetermined period of time, the system control will place the firearm in the sleep mode. By determining the viability of the round of ammunition present within the chamber, the system control conserves energy, thereby increasing reliability, as well as providing a mechanism to screen out defective rounds of ammunition.

In addition to checking the battery to determine the amount of power available, the system control means can be programmed to calculate the approximate number of rounds that can be fired, given the voltage level of the battery. This information can be communicated to the operator of the firearm, and the operator can act accordingly, deciding when to change the battery based on the circumstances at that time.

The electronically controlled and operated component parts of the firearm of the present invention[, including] *include, for example,* the bolt assembly, trigger assembly, voltage increasing means, electronic safety, status indicator, blind mate circuitry connections, system authorization switch, and electronic switching means for isolating the firing pin also provide desirable advantages.

The movable configuration of the bolt assembly provides an additional safety feature because the firing pin can only receive power, if the trigger is pulled and the system control permits, if the bolt assembly is in the closed and locked position. If the bolt assembly is not in the closed and locked position, it will not be aligned with the contact on the trigger assembly, and thus the firing pin will be isolated from the voltage increasing means and battery.

The firing pin is movable within the bolt assembly to ensure contact between the firing pin and a round of ammunition within the chamber, given the reasonable tolerances and minute variations in the ammunition. Rearward movement of the firing pin is restricted so as to lend support to the primer cap of a round of ammunition within the chamber.

The electronic switching means allows the system control to isolate the firing pin and safely discharge the voltage increasing means through a secondary path upon detection of a malfunction*, such as by discharging the voltage in the voltage increasing means to ground as is known in the art.* The electronic switching means also permits the system control to isolate the firing pin if the firearm has been inactive for a period of time, or the other conditions specified, including, the absence of a round of ammunition within the chamber of the barrel; the firearm's safety being in the safe position; the bolt being in the unlocked position; the bolt being in the open position; the turning off of the system authorization switch; the detection of a level of voltage from the voltage supply means falling below a predetermined level; the passing of a predetermined period of inactivity of the firearm; and the failure or malfunction of the system control means or any component connected thereto.

The blind mate circuitry connections allow the firearm to be disassembled for cleaning or other purposes, without requiring the operator to manually disconnect or reconnect any wires. The contacts are positioned within each part of the firearm to be connected when the firearm is assembled, and disconnected when the firearm is disassembled. For example, the barrel assembly can be removed from the firearm, cleaned, and reinserted. The electronic connections will be automatically remade when the barrel assembly is reinserted. The blind mate circuitry, in addition to simplifying the cleaning process, also provides increased reliability as a result of the fact that the electronic connections between components will be automatically made, preventing faulty or incomplete communication between the components and the system control means, and reducing the likelihood of short circuits or other electronic malfunctions due to defective or incomplete connections.

In addition to the above advantages, the present invention provides a means of increasing the inherent accuracy of a firearm by reducing its lock time and eliminating the physical movement typically associated with a mechanical or percussion firing pin. The only physical movement during firing of the present invention is associated with the pulling of the trigger. Accordingly, the firearm of the present invention provides significantly reduced lock times coupled with the above described features.

We claim:

1. In an electronic firearm for firing electrically activated ammunition, comprising a barrel [attached to a receiver], a chamber formed in the barrel [adjacent to the receiver, the receiver being] *and* adapted to receive at least one round of electrically fired ammunition, [the barrel and receiver encased in a stock, a moveable bolt assembly positioned within the receiver, the bolt assembly being adapted to convey a round of ammunition from the receiver into the chamber of the barrel, the bolt assembly comprising a bolt body, a bolt handle capable of moving the bolt assembly among open, closed, and the closed and locked positions, and] an electrically conductive firing pin, a trigger assembly [operatively connected to the bolt assembly], a voltage supply means, and a safety mechanism [having at least a safe and fire position], the improvement comprising:

A. A system control means receiving power from the voltage supply means, programmed to control firing[, safety, power conservation, and diagnostic functions] *upon actuation of the trigger assembly*, the system control means comprising:

i. Voltage increasing means connected to transmit increased voltage to the firing pin;

ii. Switching means for isolating the firing pin from the voltage increasing means, and the voltage increasing means from the voltage supply means, the switching means being activated upon the occurrence of at least one condition selected from:

a. the absence of a round of ammunition within the chamber of the barrel;

b. the safety *mechanism* being in [the] *a* safe position;

c. [the bolt being in the unlocked position;

d. the bolt being in the open position;

e.] the passing of a predetermined period of inactivity of the firearm; and

[f.] *d.* the failure or malfunction of the system control means or any component connected thereto;

iii. [Means for electronically detecting the presence of a round of ammunition within the chamber of the barrel;

iv. Means for monitoring the capacity of the voltage supply means; and v.] Electronic safety operatively connected to the safety mechanism for preventing voltage from reaching the firing pin when the safety *mechanism* is in the safe position and for preventing the system control means from detecting a trigger pull when the safety *mechanism* is in the safe position[;

B. Electronic trigger switch operatively connected to the trigger and the system control means, the electronic trigger switch adapted to send a signal to the system control means when the trigger is pulled;

C. Electrical isolation means insulating the body of the firing pin, the firing pin having a forward conductive end and a rearward conductive area, the forward conductive end positioned to transmit voltage to a round of ammunition within the chamber of the barrel only when the bolt assembly is in a closed and locked position, the rearward conductive area positioned to receive voltage only when the bolt assembly is in the closed and locked position; and D. At least one indicator operatively connected to the system control means].

2. A firearm of claim 1 [wherein the] *and further including a* bolt assembly [has] *having* front and rear ends and *which* is movably positioned within [the] *a* receiver, *positioned* behind and substantially aligned with the barrel, the bolt assembly comprising a hollow bolt body operatively connected at its rear end to a hollow bolt plug, a bolt handle on the rear of the bolt assembly, [a movable firing pin assembly within the bolt body having forward and rearward ends,] and a firing pin spring to bias the firing pin [assembly] forward by acting between the bolt plug and [the rear] *a rear end* of the firing pin [assembly].

3. A firearm of claim 2 wherein the bolt plug is sealed at its rear end, and [the firing pin assembly within the bolt body comprises] *further comprising* a firing pin plunger [at its rearward end, the firing pin plunger] positioned within the bolt plug and operatively connected to a firing pin plug, a firing pin plunger insulator between the firing pin plunger and the firing pin plug, [and a firing pin at the forward end of the firing pin assembly, a] *with the* firing pin spring positioned between the sealed rear end of the bolt plug and the [rearward] *rear* end of the firing pin plunger to bias the firing pin forward by acting on the firing pin plunger, a firing pin shoulder within the front end of the bolt body positioned to restrict the forward movement of the firing pin, the rearward movement of the firing pin being limited by the plunger contacting the rear of the bolt plug, a bolt head operatively connected to the front end of the bolt body having lugs positioned to engage slots extending from the front of the receiver into the rear of the chamber of the barrel, a firing pin contact at the rear end of the bolt assembly positioned to connect the rearward conductive area of the firing pin with an electrical contact on [a] *the* trigger assembly when the bolt assembly is in the closed and locked position, a bolt plug assembly comprising the hollow bolt plug, a bolt plug detent on the bolt plug, a bolt plug detent spring positioned between the bolt plug and the bolt plug detent to bias the bolt plug detent forward, and a projection on the bolt plug detent positioned to engage the trigger assembly when the bolt is closed.

4. A firearm of claim 3 wherein the firing pin plug and the firing pin are adapted to be adjustably connected to permit adjustment of the firing pin in relation to the firing pin plug so that the forward tip of the firing pin is adjustable with respect to the bolt face when the firing pin is in its rearwardmost position.

5. A firearm of claim 3 wherein the firing pin plug is a threaded firing pin adjustment screw adapted to fit into a threaded aperture in the rear end of [the bolt plug, and] the firing pin [assembly comprises the firing pin adjustment screw at its rearward end, the screw operatively connected to a firing pin plunger], *and wherein* the firing pin [at the forward end of the firing pin assembly] *plug is* operatively connected to the firing pin plunger, [and a] *with the* firing pin plunger insulator between the firing pin *plunger* and the firing pin [plunger] *plug*, the firing pin [assembly being] *is* biased forward by the firing pin spring acting on the firing pin plunger and the rear of the bolt plug.

6. A firearm of claim 3 wherein the projection on the bolt plug detent, biased forward by the bolt plug detent spring, is positioned to contact a projection on the rear end of the trigger assembly and wherein the bolt assembly, when in the closed and locked position, is biased rearward by the interaction of the detent and the mating projection, securing the bolt assembly in position with the help of the interaction of the lugs with the slots in the receiver.

7. A firearm of claim 1 wherein the system control means is selected from at least one of the group consisting of software, firmware, microcode, microprocessor, microcontroller, discrete digital logic, discrete analog logic, and custom integrated logic.

8. A firearm of claim 1 wherein the system control means is a microcontroller.

9. A firearm of claim 1 wherein the system control means is positioned within the stock.

[10. A firearm of claim 1 wherein the system control means iis external from the firearm.]

11. A firearm of claim 1 wherein the system control means is a removable modular circuit board.

12. A firearm of claim 11 wherein the circuit board comprises a protective surface modification.

13. A firearm of claim 1 wherein the voltage increasing means is a boost converter comprising at least one inductor, diode, capacitor, and switch.

14. A firearm of claim 1 [wherein the] *and further comprising* means for electronically detecting the presence of a round of ammunition within the chamber of the barrel [comprises], *including* at least [two electrodes] *one electrode* positioned to contact electrically conductive portions of a round of ammunition within the chamber.

15. A firearm of claim 14 wherein *said at least* one electrode [is] *comprises* the firing pin.

16. A firearm of claim 14 wherein the means for electronically detecting the presence of a round of ammunition within the chamber further comprises means for determining whether the detected round is viable.

17. A firearm of claim 16 wherein the means for determining whether the detected round is viable comprises means for measurement of the DC resistance of the round.

18. A firearm of claim 16 wherein the means for determining whether the detected round is viable comprises means for measurement of the AC impedance of the round.

19. A firearm of claim 1 [wherein the] *and further including an* electrical isolation means [comprises] *comprising* a modification of [the] *a* surface of the firing pin.

20. A firearm of claim [16] *19* wherein the surface modification comprises ion implantation.

21. A firearm of claim [1] *19* wherein the electrical isolation means comprises an insulating coating.

22. A firearm of claim 21 wherein the insulating coating comprises amorphous diamond.

23. A firearm of claim 21 wherein the insulating coating comprises ceramic.

24. A firearm of claim 23 wherein the ceramic is selected from the group consisting of alumina and magnesia stabilized zirconia.

25. A firearm of claim 1 [wherein the] *and further including an* electrical isolation means [comprises] *comprising* an insulating sleeve surrounding the firing pin.

26. A firearm of claim 1 further comprising blind mate circuitry connections operatively connecting and providing electronic signals, commands, and power to all electronic components associated with the receiver, chamber of the barrel, and stock of the firearm.

27. A firearm of claim 26 wherein the blind mate circuitry connections are wired in place in the stock, and the barrel assembly of the firearm, so that the connections are broken and made when the firearm is disassembled and reassembled, respectively.

28. A firearm of claim 1 further comprising a system authorization switch.

29. A firearm of claim 28 wherein the system authorization switch comprises a key switch to activate the system control means.

30. A firearm of claim 1 *and* wherein the system control means and electronic safety are adapted to isolate the firing pin when the safety *mechanism* is in the safe position by rejecting signals received from the trigger [switch] *assembly* (a) when the trigger *assembly* is [pulled] *activated*, and (b) when the trigger *assembly* is [pulled] *activated* and held while the safety *mechanism* is switched from the safe position to [the] *a* fire position.

31. A firearm of claim 1 wherein the system control means is adapted to cause energy stored in the voltage increasing means to be diverted [to a secondary discharge path] upon isolation of the firing pin.

32. A firearm of claim 1 wherein the system control means is adapted to monitor the level of voltage emanating from the voltage supply means.

[33. A firearm of claim 32 wherein the system control means is adapted to cause the switching means to isolate the firing pin upon the detection of power emanating from the voltage supply means in excess of a predetermined level.]

34. A firearm of claim 32 wherein the switching means is activated by the system control means to isolate the firing pin upon the detection of voltage emanating from the voltage supply means below a predetermined level.

35. A firearm of claim 1 wherein the system control means is adapted to monitor the level of voltage emanating from the voltage increasing means.

[36. A firearm of claim 35 wherein the system control means is adapted to cause the switching means to isolate the firing pin upon the detection of power emanating from the voltage increasing means in excess of a predetermined level.]

37. A firearm of claim 35 wherein the switching means is activated by the system control means to isolate the firing pin upon the detection of voltage emanating from the voltage increasing means below a predetermined level.

38. In a process for firing electrically activated ammunition from an electronic firearm comprising a barrel [attached to a receiver], a chamber formed in the barrel [adjacent to the receiver, the receiver being] *and* adapted to receive at least one round of electrically fired ammunition, [the barrel and receiver encased in a stock, a moveable bolt assembly positioned within the receiver, the bolt assembly being adapted to convey a round of ammunition from the receiver into the chamber of the barrel, the bolt assembly comprising a bolt body, a bolt handle capable of moving the bolt assembly among open, closed, and closed and locked positions, and] an electrically conductive firing pin, a trigger assembly [operatively connected to the bolt assembly], a voltage supply means *for supplying a voltage to the firing pin*, and a safety [having at least a safe and a fire position], the improvement comprising:

A. Controlling and coordinating [all firing, safety, power conservation, and diagnostic functions, and regulating]

the distribution of power to the firing pin *through a system control* by;

i. [Increasing the voltage from the voltage supply means, and regulating] *Regulating* the transmission [of the increased] voltage to the firing pin;

ii. Conserving power by isolating the firing pin from [the voltage increasing means, and the voltage increasing means from] the voltage supply means, upon the occurrence of at least one condition selected from:

a. the absence of a round of ammunition within the chamber of the barrel;

b. the safety being in [the] *a* safe position;

c. [the bolt being in the unlocked position;

d. the bolt being in the open position;

e.] the passing of a predetermined period of inactivity of the firearm;

*d. a system authorization switch being in an off position;*

[f]*e.* the failure or malfunction of the system control means or any component connected thereto; *and* iii. [Electronically detecting the presence of ammunition within the chamber of the barrel;

iv. Monitoring the capacity of the voltage supply means; and v.] Preventing voltage from reaching the firing pin when the safety is in the safe position and preventing the system control from accepting [the] *a* signal from the trigger [switch] *assembly* generated by [a trigger pull] *acutation of the trigger assembly* when the safety is in the safe position[;

B. Sending a signal to the system control means when the trigger is pulled; and

C. Indicating the status of the firearm].

39. A process of claim 38 further comprising *detecting the presence of a round of ammunition within the chamber, and* determining whether a detected round of ammunition within the chamber is viable.

40. A process of claim 38 further comprising [visually] indicating the status of the firearm.

*41. The firearm of claim 1 and further including at least one indicator operatively connected to the system control means.*

*42. The firearm of claim 1 and wherein the firing pin includes a forward conductive end for transmitting voltage to a round of ammunition within the chamber, and a rearward conductive area to receive voltage from the voltage increasing means.*

*43. A process of claim 38 and further including electronically detecting the presence of a round of ammunition within the chamber of the barrel.*

*44. A process of claim 38 and further including monitoring the capacity of the voltage supply means.*

*45. A process of claim 38 and further including preventing voltage from reaching the firing pin when the safety is in a safe position.*

*46. An electronic firearm, comprising:*

*a barrel;*

*a chamber in which a round of electrically fired ammunition is received;*

*a conductive firing pin for transmitting power to the round of ammunition;*

*a voltage supply for supplying power for initiating firing of the round of ammunition;*

*a system control powered by said voltage supply and monitoring the firearm, for controlling the firing of the round of ammunition, said system control including a switching means for isolating said firing pin from receiving power supplied by said voltage supply upon the occurrence of at least one of the following conditions:*

*a. insufficient energy to initiate the firing of the round of ammunition;*

*b. detection of voltage from said voltage supply below a predetermined level;*

*c. detection of voltage from said voltage supply above a predetermined level;*

*d. absence of a round of ammunition in said chamber;*

*e. lack of viability of the round of ammunition;*

*f. inactivity of the firearm for a predetermined time;*

*g. a system authorization switch being in an off position; and*

*h. failure of the system control or any component connected thereto;*

*a trigger assembly communicating with said system control and having a trigger, whereby as said trigger is activated, a signal is sent to said system control to initiate firing of the round of ammunition; and*

*said system control further including an electronic safety operatively connected to a firearm safety mechanism and responsive to activation of said firearm safety mechanism for preventing power from reaching said firing pin and preventing said system control from detecting activation of said trigger.*

*47. The electronic firearm of claim 46 and wherein said system control further comprises a voltage increasing means for increasing voltage received from said voltage supply to a voltage sufficient to initiate the firing of the round of ammunition.*

*48. The electronic firearm of claim 47 and wherein said switching means isolates said voltage supply from said voltage increasing means.*

*49. The electronic firearm of claim 47 and wherein said switching means isolated said voltage increasing means from said firing pin.*

*50. The electronic firearm of claim 46 and further comprising an indicator communicating with said system control for indicating the status of the firearm.*

*51. The electronic firearm of claim 46 and further comprising a system authorization switch communicating with said system for controlling access to the firearm.*

*52. The electronic firearm of claim 46 and further comprising an insulating coating applied to said firing pin.*

*53. The electronic firearm of claim 46 and further comprising an insulating sleeve positioned about said firing pin.*

*54. The electronic firearm of claim 46 and wherein said system control and electronic safety are adapted to isolate said firing pin when said firearm safety mechanism is in a safe position by rejecting signals received from said trigger (a) when said trigger is activated, and (b) when said trigger is activated and held while said firearm safety mechanism is moved from a safe position to a fire position.*

*55. The electronic firearm of claim 46 and further icluding means for electronically detecting the presence of a round of ammunition in said chamber.*

*56. The electronic firearm of claim 46 and wherein said firearm safety mechanism is movable between a fire and a safe position for placing the firearm in a nonoperative condition upon movement of said firearm safety mechanism to said safe position.*

*57. The electronic firearm of claim 46 and wherein said system control includes programming to monitor and control the firearm including initiating the sleep mode for the firearm to place the firearm in a nonoperative condition.*

*58. The electronic firearm of claim 46 and wherein said system control comprises at least one of the following: a microprocessor, microcontroller, software, firmware, microcode, digital logic, analog logic; and custom integrated logic.*

*59. An electronic firearm, comprising:*

*a barrel;*

*a chamber in which a round of electrically initiated ammunition is received;*

*a firing pin;*

*a trigger for initiating firing of the round;*

*a voltage supply for supplying power to said firing pin for firing the round;*

*a system control for monitoring the firearm and controlling the power supplied to said firing pin in response to at least one condition selected from:*

*a. insufficient energy to initiate the firing of the round of ammunition;*

*b. detection of voltage from said voltage supply below a predetermined level;*

*c. detection of voltage from said voltage supply above a predetermined level;*

*d. inactivity of the firearm for a predetermined time;*

*e. a system authorization switch being in an off position; and*

*f. failure of said system control or any component connected thereto;*

*said system control including a switching means for isolating said firing pin from said voltage supply to prevent the firing of the round of ammunition, and an electronic safety responsive to activation of a firearm safety for isolating said firing pin and preventing said system control from receiving a signal responsive to activation of said trigger.*

*60. The electronic firearm of claim 59 and further including a voltage increasing means connected to said voltage supply and said firing pin for transmitting an increased voltage to said firing pin for firing the round of ammunition.*

*61. The electronic firearm of claim 59 and further comprising at least one indicator communicating with said system control means for indicating the status of the firearm.*

*62. The electronic firearm of claim 59 and wherein said firing pin comprises a forward conductive end for transmitting voltage to a round of ammunition within the chamber, and a rearwrad conductive area to receive voltage from said voltage supply.*

*63. The electronic firearm of claim 59 and wherein said firing pin further includes an insulating coating applied thereto.*

*64. The electronic firearm of claim 59 and further including an insulative sleeve positioned about said firing pin.*

*65. The electronic firearm of claim 59 and further including a means for detecting the presence of a round of ammunition in said chamber.*

*66. The electronic firearm of claim 59 and further comprising a system authorization switch communicating with said system control means for controlling access to the firearm.*

*67. An electronic firearm, comprising:*

*a barrel;*

*a chamber in which a round of electrically initiated ammunition is received;*

*a firing pin;*

*a trigger for initiating firing of the round;*

*a voltage supply for supplying power to said firing pin for firing the round;*

*a system control for monitoring the firearm and controlling the power supplied to said firing pin in response to malfunction or failure of the system or any component connected thereto, said system control including a switching means for isolating said firing pin from said voltage supply to prevent the firing of the round of ammunition; and*

*a means for detecting the presence of a round of ammunition in the chamber.*

*68. A method of firing a round of electrically-initiated ammunition from a firearm, comprising:*

*receiving a round of ammunition within a chamber;*

*sending a signal to a system control to initiate firing of the round of ammunition as a trigger is activated;*

*supplying power from a voltage supply for initiating firing of the round of ammunition;*

*electronically detecting the round of ammunition within a chamber of the firearm;*

*monitoring the firearm with the system control and controlling the firing of the round of ammunition with the system control;*

*isolating a firing pin of the firearm from receiving power supplied by the voltage supply upon the detection of at least one of the following conditions by the system control:*

*a. insufficient energy to initiate the firing of the round of ammunition;*

*b. detection of voltage from the voltage supply below a predetermined level;*

*c. detection of voltage from the voltage supply above a predetermined level;*

*d. absence of a round of ammunition in the chamber;*

*e. inactivity of the firearm for a predetermined time;*

*f. an authorization switch being in an off position; and*

*g. failure of the system control or any component connected thereto; and*

*transmitting power to the round of ammunition through the firing pin.*

*69. The method of claim 68 and further comprising increasing the voltage from the voltage supply to a level sufficient to initiate the firing of the round of ammunition, in a voltage increasing means, and isolating the voltage supply from the voltage increasing means.*

*70. The method of claim 69 and further comprising isolating the voltage increasing means from the firing pin.*

*71. The method of claim 68 and further comprising detecting viability of the round of ammunition in said chamber.*

*72. The method of claim 68 and further comprising initiating a sleep mode for the firearm to place the firearm in a nonoperative condition.*

* * * * *

UNITED STATES PATENT AND TRADEMARK OFFICE

CERTIFICATE OF CORRECTION

PATENT NO. : RE 38,794 E
APPLICATION NO. : 09/483467
DATED : September 13, 2005
INVENTOR(S) : Dale R. Danner et al.

It is certified that error appears in the above-identified patent and that said Letters Patent is hereby corrected as shown below:

Title page in Item [75] Inventor:
Add --Vincent B. Norton, Elizabethtown--
Add --James W. Ronkainen, Hodgenville--
Add --David S. Wolterman, Elizabethtown--, all of Ky.
Column 2, line 38, ":" should be changed to --;--
Column 10, line 51, "them" should be changed to -- then --
Column 10, line 57, "on" should be changed to -- an --
Column 11, line 5, "appplied" should be changed to -- applied --
Column 15, claim 10, line 23, "iis" should be changed to --is--
Column 17, claim 38, line 5, "[of the Increased]" should be changed to --of [the increased]--
Column 17, claim 38, line 30, "acutation" should be changed to --"actuation"--.
Column 18, claim 49, line 37, "isolated" should be changed to --isolates--
Column 18, claim 51, line 44, "system for controlling" should be changed to --system control for controlling--
Column 18, claim 55, line 56, "icluding" should be changed to --including--
Column 19, claim 58, line 4, "logic;" should be changed to --logic,--
Column 19, claim 62, line 50, "rearwrad" should be changed to --rearward--

Signed and Sealed this

Tenth Day of April, 2007

JON W. DUDAS
*Director of the United States Patent and Trademark Office*